United States Patent

[11] 3,628,104

[72] Inventors Mark Markarian
 Williamstown;
 Robert J. McDonough, North Adams, both of Mass.
[21] Appl. No. 883,076
[22] Filed Dec. 8, 1969
[45] Patented Dec. 14, 1971
[73] Assignee Sprague Electric Company
 North Adams, Mass.

[54] HERMETICALLY SEALED ALUMINUM ELECTROLYTIC CAPACITOR
 6 Claims, 1 Drawing Fig.

[52] U.S. Cl. .................................................. 317/230,
 317/233
[51] Int. Cl. .................................................. H01g 1/02
[50] Field of Search .......................................... 317/230,
 231, 233

[56] References Cited
 UNITED STATES PATENTS

| | | | |
|---|---|---|---|
| 3,264,708 | 8/1966 | Diggens...................... | 317/230 |
| 3,275,901 | 9/1966 | Merritt et al................. | 317/230 |
| 3,301,270 | 1/1967 | Horn............................ | 317/230 |
| 3,370,874 | 2/1968 | Scherer et al................ | 317/230 X |

Primary Examiner—James D. Kallam
Attorneys—Connolly and Hutz, Vincent H. Sweeney, James Paul O'Sullivan and David R. Thornton ABSTRACT: An aluminum foil electrolytic capacitor having tantalum to glass hermetic end seals.

Patented Dec. 14, 1971   3,628,104
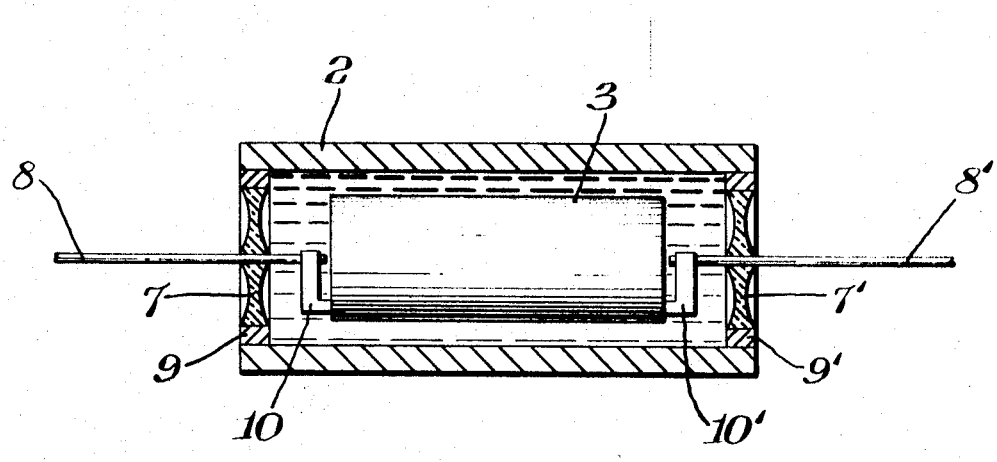

HERMETICALLY SEALED ALUMINUM ELECTROLYTIC CAPACITOR

BACKGROUND OF THE INVENTION

This invention relates to a heremetically sealed aluminum electrolytic capacitor and more particularly to an aluminum foil electrolytic capacitor having hermetic glass end seals.

Electrolytic capacitors must be effectively sealed in order to prevent loss of electrolyte as well as preventing the entrance of any contaminants which cause a variation and breakdown in the electrical properties of the capacitor. Present aluminum electrolytic capacitors with organic based seals have a limited environmental temperature range and tend to leak at temperatures above 125° C. The prime difficulty is in preventing creepage of the electrolyte through the seal along the container edge which occurs because of the inability of organic crimped or spun seals to form intimate hermetic bonds with the container edge.

Other difficulties arise when excess soldering flux is removed from the capacitor case by clorinated hydrocarbon solvents. These solvents have a tendency to creep between the end seal and container and they readily diffuse through the elastomer O-rings which are often used as the gasket seal for aluminum electrolytic capacitors. Contamination of the electrolyte by these cleaning solvents causes immediate corrosion of the capacitor case and foil leading to the eventual failure of the capacitor.

Effective glass seals hermetically bonded to appropriate lead wires which have substantially the same thermal coefficient of expansion of the glass have been produced thereby eliminating the creepage of electrolyte through the seal. Heretofore aluminum foil capacitors having hermetic glass seals have not been produced because of the inability to form an effective aluminum to glass hermetic bond. Effective glass to aluminum hermetic bonds cannot be formed because of the great difference to the coefficients of thermal expansion for glass and aluminum.

Therefore it is an object of this invention to produce an aluminum electrolytic capacitor which is sealed so as to eliminate the problems of electrolyte creepage and contamination from outside solvents.

It is a further object of this invention to provide a hermetic glass sealed aluminum electrolytic capacitor capable of withstanding higher temperatures than heretofore possible with organic type seals.

SUMMARY OF THE INVENTION

A hermetically sealed electrolytic capacitor in accordance with this invention comprises a tubular metal casing sealed at both ends by hermetic glass seals and containing a suitable electrolyte. The capacitor element comprises a pair of convolutely would aluminum electrode foils. The casing is sealed by welding header assemblies to both ends of the casing. Each header assembly consists of a metal ring member having extending therethrough a metal lead wire composed of tantalum, both of which are thermally fused to a glass body filling the space between. The tantalum lead wires are welded to the anode and cathode foils with the outer diameters of the metal ring members welded to the open ends of the casing thereby hermetically sealing the capacitor. The glass has substantially the same coefficient of thermal expansion as the tantalum lead wire. The thermal expansion value of the metal ring is somewhat higher than the glass, but is generally proportional to the rate of increase of thermal expansion of the other two components of the seal.

BRIEF DESCRIPTION OF THE DRAWING

The FIGURE shows a sectional view of a capacitor formed in accordance with this invention.

DESCRIPTION OF THE PREFERRED EMBODIMENT

The FIGURE shows an electrolytic capacitor formed in accordance with this invention. Electrolytic capacitor 1 is shown comprising a stainless steel casing 2 containing a rolled capacitor section 3 made of a pair of convolutely wound electrode foils of aluminum, separated by paper or other dielectric spacer material, roll 3 usually being additionally wrapped with dielectric sheet material to electrically insulate it from casing 2. The rolled section is immersed in and impregnated by a suitable liquid electrolyte which is contained in casing 2. The electrolyte may be of any conventional or known type of capacitor electrolyte, as for example an aqueous ammonium pentaborate-glycol solution or nonaqueous organic liquid composition or mixture and it may be liquid, gel paste or other form.

Casing 2 is tubular in form having both ends open. The open ends of casing 2 are sealed by tantalum to glass to stainless steel seals. Glass eyelets 7 and 7' are fused around tantalum leads 8 and 8' so as to form hermetic bonds between the tantalum and glass. The outer diameters of glass eyelets 7 and 7' are fused to the inner surface of stainless steel rings 9 and 9' so as to form a hermetic bond between the glass and stainless steel compression rings. Aluminum tab 10 extends from the anode foil of the capacitor roll 3 and it is lap welded to tantalum lead 8 of the glass seal. Aluminum 10' extends from the cathode foil of the capacitor roll 3 and it is lap welded to tantalum lead 8' of the other glass seal. The capacitor may be assembled by first forming the end seals which comprises glass eyelets 7 and 7' fused on their inner diameters to tantalum leads 8 and 8' and on their outer diameters to stainless steel compression rings 9 and 9'. Tantalum leads 8 and 8' are then lap welded to aluminum tabs 10 and 10' which extend from the anode and cathode foils of capacitor roll 3. Capacitor roll 3 is impregnated with a suitable electrolyte and then it is inserted from one end of casing 2. The stainless steel rings are then ring welded around their outer diameters to the ends of casing 2 by a conventional welding process so as to hermetically seal the ends of the casing.

In an alternative configuration aluminum tabs 10 and 10' extending from the anode foil and cathode foils would be eliminated and tantalum leads would be directly welded to the anode and cathode foils by the Projection Welding technique as disclosed in copending application, Ser. No. 821,742 filed on May 5, 1969 in the name of Dominick J. Zeppieri and Charles Wright. The tantalum leads welded to the anode and cathode foils would then be cross wire welded to tantalum leads 8 and 8'.

The glass fused to form the hermetic glass seal should have a coefficient of thermal expansion for tantalum which is $6.5 \times 10^{-6}/°$ C. in all sealing temperature ranges. The following are specific examples of compositions of glass which have proved satisfactory.

| Example I | Percent by Weight |
|---|---|
| BaO | 35 |
| $Al_2O_3$ | 25 |
| $B_2O_3$ | 40 |

| Example II | Percent by Weight |
|---|---|
| BaO | 35 |
| $Al_2O_3$ | 25 |
| $B_2O_3$ | 35 |
| $CeO_3$ | 5 |

The aforementioned coefficients of thermal expansion of the glass material approximates very closely that of tantalum over a wide temperature range. The thermal expansion value of the stainless ring is somewhat higher, but is generally proportional to the rate of increase of thermal expansion of the other two components of the seal. The tantalum to glass to stainless hermetic seal is fused in a substantially inert atmosphere in order to prevent embrittlement of the tantalum caused by excessive oxidation. There is no need to oxidize the tantalum before fusion because the oxygen from the air and moisture which inherently contaminate the inert atmosphere is sufficient to form the necessary oxide coating on the tantalum. The oxide is necessary to the formation of a glass to tantalum seal because it is soluble in glass and adheres to the surface of the glass forming a good hermetic bond. The oxide bond acts as an effective hermetic seal regardless of the absence of compressive forces. The thermal expansion value of the stainless steel ring is somewhat higher than the glass thereby forming a compression seal. However in general the thermal expansion of the ring is proportional to the rate of increase of the thermal expansion of the other two components of the seal so as to maintain an effective seal within a wide temperature range.

Capacitors produced in accordance with the above-described invention were tested and found to be superior to aluminum electrolytic capacitors with composition seals. Aluminum electrolytic capacitors having hermetic glass seals were life tested for 500 hours at 150° C. and found to have average weight losses in the order of 1/100 that of similar aluminum electrolytic capacitors having composition seals. The weight loss for aluminum electrolytic capacitors life tested at 150° C. was not appreciably higher than that for the same capacitors tested at 125° C. while aluminum electrolytic capacitors with composition seals normally leak at 150° C. Also the aluminum electrolytic capacitors could be suitably cleaned and defluxed with clorinated hydrocarbon solvents without risk of the solvents leaking through the seal so as to contaminate the electrolyte and corrode the capacitor foils.

What is claimed is:

1. A hermetically sealed aluminum electrolytic capacitor comprising a metal casing, an electrolytic capacitor section in said casing, said section including a pair of aluminum electrodes separated by a dielectric and containing an electrolyte, a compression glass seal hermetically sealing an end of said casing, said seal including a tantalum leadwire passing through a glass body having substantially the same coefficient of thermal expansion and fused thereto, a compression ring fused around said glass body, said ring being welded to said casing to hermetically seal said casing, said tantalum leadwire being electrically connected to one of said aluminum electrodes within said casing.

2. The capacitor of claim 1 wherein said casing is a tube, a second said seal welded to said casing to hermetically seal the other end of said casing, the tantalum leadwire of said second seal being electrically connected to the other of said aluminum electrodes within said casing.

3. The capacitor of claim 2 wherein said electrodes are aluminum foils that are convolutely would and separated by said dielectric, and said tantalum leadwires are each joined to aluminum tabs on said foils.

4. The capacitor of claim 2 wherein said casing and ring members are stainless steel.

5. The capacitor of claim 4 wherein said lead wires are electrically connected to said electrode foils by lap welding.

6. The capacitor of claim 4 wherein said lead wires are electrically connected to said electrode foils by projection welding.

* * * * *